United States Patent
Iida et al.

[11] Patent Number: 5,326,496
[45] Date of Patent: Jul. 5, 1994

[54] COMPENSATOR FOR LIQUID CRYSTAL DISPLAY

[75] Inventors: Shigeki Iida; Takehiro Toyooka, both of Yokohama; Yasuyuki Takiguchi; Takamichi Enomoto, both of Ota, all of Japan

[73] Assignees: Nippon Oil Company Limited; Ricoh Company Limited, Tokyo, Japan

[21] Appl. No.: 149,002

[22] Filed: Nov. 8, 1993

Related U.S. Application Data

[63] Continuation of Ser. No. 6,666, Jan. 19, 1993, abandoned, which is a continuation of Ser. No. 470,100, Jan. 25, 1990, abandoned.

[30] Foreign Application Priority Data

Jan. 26, 1989 [JP]  Japan ................................. 1-15099
Jun. 15, 1989 [JP]  Japan ................................ 1-150559

[51] Int. Cl.$^5$ ..................... C09K 19/52; C09K 19/56; G02F 1/13
[52] U.S. Cl. ............................ 252/299.01; 252/299.4; 359/73; 359/106
[58] Field of Search ..................... 252/299.01, 299.4; 359/73, 106

[56] References Cited

U.S. PATENT DOCUMENTS

| | | | |
|---|---|---|---|
| 4,293,435 | 10/1981 | Portugall et al. | 252/299.01 |
| 4,443,065 | 4/1984 | Funada et al. | 350/335 |
| 4,702,558 | 10/1987 | Coles et al. | 350/330 |
| 4,891,418 | 1/1990 | Hara et al. | 528/195 |
| 4,892,675 | 1/1990 | Nohira et al. | 252/299.01 |
| 4,995,705 | 2/1991 | Yoshinaga et al. | 350/350 S |

FOREIGN PATENT DOCUMENTS

| | | | |
|---|---|---|---|
| 30275711 | 7/1980 | Fed. Rep. of Germany. | |
| 149624 | 6/1988 | Japan. | |
| 1206318 | 8/1989 | Japan | 350/334 |

Primary Examiner—Robert L. Stoll
Assistant Examiner—C. Harris
Attorney, Agent, or Firm—Scully, Scott, Murphy & Presser

[57] ABSTRACT

A compensator for liquid crystal display which is composed of:
  a light transmitting base;
  an alignment layer formed on said base; and
  a film formed on said alignment layer by a liquid crystalline polymer which exhibits a twisted nematic orientation in the state of liquid crystal and which assumes the state of glass at a temperature below the liquid crystal transition point thereof.

11 Claims, 1 Drawing Sheet

COMPENSATOR FOR LIQUID CRYSTAL DISPLAY

This is a continuation of copending application Ser. No. 006,666, filed Jan. 19, 1993, abandoned which was a continuation of application Ser. No. 470,100, filed on Jan. 25, 1990, now abandoned.

BACKGROUND OF THE INVENTION

The present invention relates to a compensator for liquid crystal display nd more particularly to a compensator for a super twisted nematic type liquid crystal display.

PRIOR ART

Liquid crystal display occupies an important position in the display field because of such characteristic features as being driven at a low voltage, light weight and low cost. Above all, an STN liquid crystal display is of a multiplex driven dot-matrix type which permits a large-screen display, and as compared with the conventional twisted nematic (TN) type liquid crystal display it is characteristic in that the contrast is high and the field angle is wide. Therefore, the STN liquid crystal display is widely used in the field of liquid crystal display which requires a large-screen display such as, for example, personal computers, word processors and various data terminals. However, the STN type basically cannot make display in a black-and-white mode and it is unavoidable that the display is in green to yellowish red in the absence of an electric field and in blue in the presence of an electric field. Such a colored mode display is not only undesirable to users but also involves a serious drawback of being unable to cope with coloring of a display unit. Various proposals have been made for eliminating this drawback. The change from the colored mode to the black-and-white mode can be done basically by making light which has become an elliptically polarized light after passing through a liquid crystal cell again into a linearly polarized light by the use of a compensator. As one method there has been proposed a so-called double STN method wherein the compensation is made by disposing on an STN liquid crystal cell for display another liquid crystal cell for compensation having the same cell gap and a reversed twist angle. Indeed this method permits black-and-white display, but still involves drawbacks, for example the field angle is relatively narrow and coloration is observed when seen from an oblique angle. Additionally, the production of the cell for compensation is difficult, the yield is poor, and the manufacturing cost is very high. This is a serious problem. For overcoming such drawbacks of the two-layer cell method it has been proposed to replace the cell for compensation with a single film which exhibits an equivalent optical performance to thereby realize black-and-white display (Japanese Patent Laid-Open No. 149624/1988). Basically, if it is possible to obtain a film having the same birefringence characteristic, same thickness and same pitch as those of the cell for display and having a reverse twist structure, then black-and-white display can be realized by laminating the said film to the cell for display. Actually, however, the production of such film is extremely difficult, and in the laid-open print referred to above there is found neither description nor working examples at all about the structure of and how to produce such film. It can be said that this demonstrates the difficulty of embodying the principle in question. As a convenient method for avoiding this difficulty, studies are being made about practical application of films for compensation such as a stretched polycarbonate film adjusted in its birefringence characteristic in conformity with the cell for display. However, the compensation effect of these films is insufficient, there merely is obtained a pseudo black-and-white display in bluish white in the absence of voltage, and the contrast is fairly low in comparison with that in the two-layer method. Thus, there is no example of having realized a complete black-and-white display in STN liquid crystal display using film.

For overcoming the above-mentioned difficulty involved in films for color compensation in an STN liquid crystal display, the present inventors paid attention to a high molecular liquid crystal film wherein a twisted nematic orientation having a uniform monodomain structure is immobilized, and made extensive studies and finally reached the present invention. More specifically, the present invention relates to a compensator for liquid crystal display and particularly provides a compensator for STN liquid crystal display using a high molecular liquid crystal film.

SUMMARY OF THE INVENTION

The present invention is concerned with a compensator for liquid crystal display comprising a light transmitting base, an alignment layer formed on the base, and a film formed on the alignment layer by a liquid crystalline polymer which exhibits a twisted nematic orientation in the state of liquid crystal and assumes a glassy state at a temperature below the liquid crystal transition point of the polymer. The present invention is also concerned with a compensator for liquid crystal display wherein the liquid crystalline polymer is an optically active polyester containing an ortho-substituted aromatic unit, or it is a composition comprising a polyester which contains an ortho-substituted aromatic unit as a constituent and an optically active compound. The present invention is further concerned with a compensator for STN liquid crystal display using a film formed by heat-treating on an alignment layer an optically active polyester containing an ortho-substituted aromatic unit, or a composition comprising a polyester which contains an ortho-substituted aromatic unit as a constituent and an optically active compound at a temperature above the glass transition point of the polyester followed by cooling to a temperature below the said glass transition point to immobilize a twisted nematic structure.

BRIEF DESCRIPTION OF THE DRAWINGS

The reference numerals in FIG. 1 are identified as follows.

| Reference Numeral | Identification |
| --- | --- |
| 1 | an upper polarizing plate |
| 2 | a color compensator (a twist nematic film and a base) |
| 3 | a liquid crystal cell |

-continued

| Reference Numeral | Identification |
| --- | --- |
| 4 | a lower polarizing plate |

The reference numerals in FIG. 2 are identified as follows.

| Reference Numeral | Identification |
| --- | --- |
| 5 | the polarization axis direction of the lower polarization plate |
| 6 | the rubbing direction of the lower electrode plate in the liquid crystal cell |
| 7 | the rubbing direction of the upper electrode plate in the liquid crystal cell |
| 8 | the molecular orientation direction at the bottom of the twisted nematic film |
| 9 | the molecular orientation direction at the top of the twisted nematic film |
| 10 | the polarization axis direction of the upper polarization plate |
| 11 | the twist angle of the liquid crystal in the liquid crystal cell |
| 12 | the molecular twist in the twisted nematic film |
| 13 | the angle between 7 and 8 |
| 14 | the angle between 5 and 6. |

DETAILED DESCRIPTION OF THE INVENTION

The present invention will be described in detail hereinunder.

The compensator of the present invention is obtained by heat-treating on an alignment layer a composition comprising a high-molecular liquid crystal which exhibits a uniform nematic orientation of monodomain and which permits the state of such orientation to be immobilized easily and a predetermined amount of an optically active compound, or a high-molecular liquid crystal which exhibits a uniform, twisted nematic orientation of monodomain and which permits the state of such orientation to be immobilized easily, to form a uniform, twisted nematic structure of monodomain, followed by cooling to immobilize the orientated state without impairing the orientation in the state of liquid crystal.

First, an explanation will be made about the former compensator using a composition comprising a nematic, liquid crystalline polymer and an optically active compound. The high-molecular liquid crystal as a base which exhibits a uniform nematic orientation of monodomain and which permits the state of such orientation to be immobilized easily is required to possess the following property as an essential condition. For stable immobilization of the nematic orientation, when viewed from the phase sequence of liquid crystal, it is important that there be no crystal phase in the portion lower in temperature than the nematic phase. If such crystal phase is present, cooling for immobilization proceeds invitably through the said crystal phase, resulting in breakage of the nematic phase once obtained. Therefore, the high-molecular liquid crystal used for the object of the present invention is required as an essential condition to have a glass phase in the portion lower in temperature than the nematic phase. By incorporating an optically active compound in the polymer in question, the polymer exhibits a twisted nematic orientation in the state of liquid crystal, while at temperatures below the liquid crystal transition point of the polymer it assumes glass phase and so the nematic structure can be immobilized easily. As to the kind of the polymer to be used, there may be used any polymer which exhibits nematic orientation in the state of liquid crystal and assumes the state of glass at temperatures below the liquid crystal transition point thereof. Examples are main chain type liquid crystalline polymers such as polyesters, polyamides, polycarbonates and polyester imides, as well as side chain type liquid crystalline polymers such as polyacrylates, polymethacrylates, polymalonates and polysiloxanes. Particularly, polyesters are preferred in point of easiness of preparation, good orientation and high glass transition point. Most preferably, the polyester used in the invention contains an ortho-substituted aromatic unit as a constituent. Also employable are polymers each containing as a constituent an aromatic unit having a bulky substituent group in place of an ortho-substituted aromatic unit or an aromatic unit having fluorine or a fluorine-containing substituent group. The "ortho-substituted aromatic unit" as referred to herein means a structural unit with main chain-constituting bonds ortho to each other. Examples are the following catechol, salicylic acid and phthalic acid units as well as substituted derivatives thereof:

wherein X represents hydrogen, halogen, e.g. Cl or Br, an alkyl or alkoxy group having 1 to 4 carbon atoms, or phenyl, and k is 0 to 2.

The following are particularly preferred:

-continued

In addition to the structural units describe above the polyester used in the invention comprises (a) a structureal unit (hereinafter referred to as the "diol component") derived from a diol) and a structural unit ("dicarboxylic acid component" hereinafter) derived from a dicarboxylic acid and/or (b) a structural unit ("hydroxycarboxylic acid component" hereinafter) derived from a hydroxycarboxylic acid containing both of carboxylic acid and hydroxyl group in one unit.

As examples of the diol component there may be mentioned the following aromatic and aliphatic diols:

wherein Y represents hydrogen, halogen, e.g. Cl or Br, an alkyl or alkoxy group having 1 to 4 carbon atoms, or phenyl, and 1 is 0 to 2, wherein n is an integer of 2 to 12,

Particularly, the following are preferred

-continued wherein Me and Bu represent methyl and butyl, respectively.

As examples of the dicarboxylic acid component, the following may be mentioned:

wherein Z represents hydrogen, halogen, e.g. Cl or Br, an alkyl or alkoxy group having 1 to 4 carbon atoms, or phenyl, and m 0 to 2,

As examples of the hydroxycarboxylic acid component, the following units may be mentioned:

The dicarboxylic acid:diol molar ratio is approximately 1:1 (the carboxylic acid group:hydroxyl group ratio in the case of using a hydroxycarboxylic acid). The proportion of ortho-substituted aromatic units in the polyester is in the range of preferably 5 to 40 mole %, more preferably 10 to 30 mole %. In the case where the said proportion is smaller than 5 mole %, a crystal phase tends to appear under the nematic phase, so such proportion is not desirable. A proportion larger than 40 mole % is not desirable, either, because the polymer will no longer exhibit liquid crystallinity. The following are typical examples of polyesters which may be used in the present invention;

Polymer comprising the following structural units:

Particularly, the following are preferred:

Polymer comprising the following structural units:

-continued

Polymer comprising the following structural units:

Polymer comprising the following structural units:

Polymer comprising the following structural units:

Polymer comprising the following structural units:

-continued

Polymer comprising the following structural units:

Polymer comprising the following structural units:

Also preferred are polymers which, in place of ortho-substituted aromatic units, contain as constituents such bulky substituent-containing aromatic units or aromatic units containing fluorine or fluorine-containing substituents as shown below:

-continued

These polymers range in molecular weight preferably from 0.05 to 3.0 more preferably 0.07 to 2.0, in terms of inherent viscosity as determined at 30° C. in, for example, a mixed phenol/tetrachloroethane (60/40) solvent. An inherent viscosity smaller than 0.05 is not desirable because the strength of the resulting high molecular liquid crystal will be low, while if the inherent viscosity is larger than 3.0, there will arise such problems as the deterioration of orientatability and an increase of the time required for orientation. The glass transition points of these polyesters are also important, exerting influence on the stability of orientation after immobilization thereof. Assuming that the working temperature is room temperature or thereabouts, though it also depends on the use, it is desirable that the glass transition points of the polyesters be not lower than 30° C., more preferably not lower than 50° C. In the case of a glass transition point lower than 30° C., the use of the compensator at room temperature or thereabouts may cause a change of the liquid crystal structure once immobilized, thus resulting in the deterioration of a function based on the liquid crystal structure. Therefore, such low glass transition point is not desirable.

How to prepare these polymers is not specially limited. There may be adopted any of polymerization processes known in this field, e.g. a melt polymerization process or an acid chloride process using acid chlorides of corresponding dicarboxylic acids. According to a melt polymerization process, the polymers can be prepared by polymerizing for example corresponding dicarboxylic acids and acetylated compounds of corresponding diols at high temperature and in high vacuum. Their molecular weights can be adjusted easily by controlling the polymerization time or the feed compostion. For accelerating the polymerization reaction there may be used known metal salts such as sodium acetate. In the case of using a solution polymerization process, a desired polyester can be obtained easily by dissolving predetermined amounts of dicarboxylic acid dichloride and diol in a solvent and heating the resulting solution in the presence of an acid acceptor such as pyridine.

An explanation will now be made about an optically active compound which is incorporated in the nematic liquid crystalline polymers exemplified above for imparting twist thereto. Typical examples are optically active low-molecular compounds. Any compound having optical activity can be used in the present invention, but from the standpoint of compatibility with the base polymer it is desirable to use optically active, liquid crystalline compounds. The following are examples:

cholesterol derivatives.

As examples of the optically active compound used in the present invention there also may be mentioned optically active high-molecular compounds. Any high polymer may be used if only it contains an optically active group in the molecule, but when the compatibility with the base polymer is taken into account, it is desirable to use a high polymer which exhibits liquid crystallinity. Examples are the following liquid crystalline high polymers having optical activity: polyacrylates, polymethacrylates, polymalonates, polysiloxanes, polyesters, polyamides, polyester amides, polycarbonates, polypeptides, and cellulose. Above all, from the standpoint of compatibility with the nematic liquid crystalline polymer serving as the base, mainly aromatic, optically active polyesters are most preferred. Examples are the following polymers:

Polymer comprising the following structural units:

Polymer comprising the following structural units:

Polymer comprising the following structural units:

(n = 2-12)

Polymer comprising the following structural units:

Polymer comprising the following structural units:

Polymer comprising the following structural units:

Polymer comprising the following structural units:

Polymer comprising the following structural units:

Polymer comprising the following structural units:

Polymer comprising the following structural units:

Polymer comprising the following structural units:

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

The composition of the present invention can be prepared by mixing a nematic liquid crystalline polymer and an optically active compound at a predetermined ratio by a solid mixing, solution mixing or melt-mixing method and, if necessary, evaporating the solvent used. The proportion of the optically active component in the composition is in the range of preferably 0.1 to 50 wt %, more preferably 0.5 to 30 wt %, although it differs depending on the proportion of optically active groups contained in the optically active compound or the twist- ing force of the optically active compound for imparting twist to the nematic liquid crystal. If the proportion of the optically active compound is less than 0.1 wt %, it will be impossible to impart a sufficient twist to the nematic liquid crystal, and a proportion thereof greater than 50 wt % will exert a bad influence on the orientation.

The compensator of the present invention can also be prepared by using a high molecular liquid crystal which provides a uniform, twisted nematic orientation of monodomain for itself without using any other optically active compound and which permits the state of such orientation to be immobilized easily. It is essential that the polymer in question have an optically active group molecule thereof and be optically active. Examples are main chain type liquid crystalline polymers such as polyesters, polyamides, polycarbonates and polyester imides, as well as side chain type liquid crystalline polymers such as polyacrylates, polymethacrylates and polysiloxanes. Polyesters are particularly preferred in point of easiness of preparation, superior orientatability and high glass transition point. Most preferred polyesters are those which contain ortho-substituted aromatic units as constituents. But also employable are polymers which, in place of such ortho-substituted aromatic units, contain as constituents bulky substituent-containing aromatic units or aromatic units having fluorine or fluorine-containing substituent groups. These optically active polyesters can be obtained by introducing in the nematic liquid crystalline polyesters so far explained such optically active groups as shown below using diols, dicarboxylic acids and hydroxycarboxylic acids (the * mark in the following formulae represents an optically active carbon):

The proportion of these optically active groups in the polymers is in the range of preferably 0.1 to 20 mole %, more preferably 0.5 to 10 mole %. If the said proportion is less than 0.1 mole %, there will not be obtained a twisted structure required for the compensator, and a proportion thereof large than 20 mole % is not desirable because a too strong twisting power will case the deterioration of the compensating effect. The molecular weights of these polymers are in the range of preferably 0.05 to 3.0, more preferably 0.07 to 2.0, in terms of intrinsic viscosity as determined at 30° C. in, for example, a mixed phenol/tetrachloroethane (60/40) solvent. A smaller intrinsic viscosity than 0.05 is not desirable because the strength of the resulting high molecular liquid crystal will be low, while if the intrinsic viscosity is larger than 3.0, there will arise problems such as the deterioration of orientatability and an increase of the time required for orientation because of too high viscosity during the formation of liquid crystal. Also important ape the glass transition points of these polyesters, which exert influence on the stability of orientation after the immobilization of orientation. assuming that the working temperature is room temperature or thereabouts, it is desirable that the glass transition point be not lower than 30° C., more preferably not lower than 50° C., though this differs depending on the use. If the glass transition point is lower than 30° C., the use of the compensator at room temperature or thereabouts may cause a change of the liquid crystal structure which has once been immobilized, thus resulting in the deterioration of a function based on tile liquid crystal structure.

These polymers can be prepared by the foregoing melt polycondensation process or acid chloride process.

The compensator of the present invention basically comprises a light transmitting base, an alignment layer formed on the light transmitting base and a liquid crystalline polymer film. As the light transmitting base there may be used, for example, glass, a light transmitting plastic film, or a plastic sheet. As to the plastic base, it is desirable for it to be isotropic optically. Examples of such plastics employable include polymethyl methacrylates, polystyrenes, polycarbonates, polyether sulfones, polyphenylene sulfides, polyolefins, and epoxy resins. Suitable examples of the alignment layer are polyimide films which have been subjected to a rubbing treatment. The alignment film known in this field such an obliquely vapor-deposited film of silicon dioxide and a rubbing-treated film of polyvinyl alcohol are also employable, of course. By forming a high-molecular liquid crystal film which exhibits a compensating effect on the alignment layer on the light transmitting base there is obtained the compensator of the present invention. Where a composition comprising a nematic liquid crystalline polymer and an optically active compound is used, for example in the case of solution mixing, both components are dissolved in a solvent at a predetermined ratio to prepare a solution of a predetermined concentration. In the case of using an optically active polymer which itself exhibits a twisted nematic orientatability in place of the high-molecular liquid crystal composition, it alone is dissolved in a predetermined solvent at a predetermined concentration to prepare a solution. In this case, the solvent to be used differs depending on the kind of the polymer used, but usually there may be used, for example, any of halogenated hydrocarbons such as chloroform, dichloroethane, tetrachloroethane, trichloroethylene, tetrachloroethylene and o-dichlorobenzene, mixed solvents thereof with phenol, dimethylformamide, dimethylacetamide, and dimethyl sulfoxide. The concentration of the solution differs greatly depending on the viscosity of the polymer used, but usually it is in the range of 5% to 50%, preferably 10% to 30%. The solution is then applied onto a light transmitting glass plate, plastic plate or plastic film which has been subjected to an orientation treatment. The orientation treatment may be performed by any method if only the liquid crystal molecules are orientated in parallel with the interface. A suitable example is a glass plate or film on which polyimide was applied and then subjected to a rubbing treatment. As the application method there may be adopted, for example, spin coating method, roll coating method, printing method and dipping/pulling-up method. After the application of the solution, the solvent is removed by drying and heat-treatment is performed at a predetermined temperature for a predetermined time to complete a twisted nematic orientation of monodomain. For promoting the orientation based on an interfacial effect, the lower the polymer viscosity, the better. It follows that the higher the temperature, the better. But a too high temperature is not desirable because it would cause an increase of cost and deterioration of the working efficiency. Further, since some polymers have an isotropic phase at a higher temperature region than the nematic phase, there will not be obtained orientation even if heat treatment is performed in that temperature region. Thus, it is desirable to perform the heat treatment in accordance with the characteristics of the polymer used, at a temperature above the glass transition point of the polymer and below the point of transition of an isotropic phase. A suitable temperature range is from 50° C. to 300° C., particularly from 100° to 250° C. The time necessary for obtaining a satisfactory orientation in the state of liquid crystal on the alignment layer differs depending on the polymer composition and molecular weight, but preferably it is in the range of 10 seconds to 60 minutes, more preferably 30 seconds to 30 minutes. If the said time is shorter than 10 seconds, the orientation will be unsatisfactory, and if it is longer than 60 minutes, the productivity will become lower.

The same state of orientation can be obtained also by applying the polymer in a melted condition onto the base which has been subjected to the orientation treatment and thereafter heat-treating the polymer. By performing these treatments using the high-molecular liquid crystal of the present invention there can be obtained a uniform, twisted nematic orientation throughout the whole surface on the alignment layer.

By subsequent cooling to a temperature below the glass transition point of the said high-molecular liquid crystal the orientated state thus obtained can be immobilized without impairing the orientation. Generally, in the case of using a polymer having a crystal phase in a lower temperature region than the liquid crystal phase, the orientation in the state of liquid crystal will be broken by cooling. According to the process of the present invention, because there is used a polymeric system having a glass phase under the liquid crystal phase, such phenomenon will not occur and it is possible to immobilize the twisted nematic orientation completely. The cooling speed is not specially limited. The orientation can be immobilized by merely exposing the polymer into an atmosphere held at a temperature below the glass transition point of the polymer out of the heating atmosphere. For enhancing the production efficiency there may be adopted a forced cooling such as air-cooling or water-cooling. The film thickness after the immobilization is preferably up to 100 μm, more preferably up to 50 μm. If the film thickness exceeds 100 μm, the effect of the orientated film will be deteriorated, so that it becomes difficult to obtain uniform orientation.

The present invention is characterized in that a high degree of orientation control and immobilization of the orientation can be effected by contacting only one side of the polymer film with the alignment layer to control its orientation while allowing the other side thereof to be free, for example keeping it in contact with air. Generally, the orientation control for liquid crystal is performed by contacting both interfaces with alignment layer, and when one side is in contact with air, the molecular orientation at the air interface is not uniform, thus making it impossible to obtain orientation which is uniform throughout the whole area in the film thickness direction. In the present invention, by controlling only one side there can be attained a twisted nematic orientation of monodomain and this orientation can be immobilized. This is an outstanding feature of the present invention. The film thus obtained may be used as it is, or a protective layer of a transparent plastic material may be formed thereon for the protection of the film surface. Also, it may be used In combination with another, optical element such as a polarizing film. Thus, the compensator for display, particularly the color, compensator, for STN liquid crystal display, produced according to the present invention not only permits a complete black-and-white display but also is of extremely high industrial value because of low manufacturing cost and high productivity.

EXAMPLES

Working examples of the present invention and comparative examples will be described below, but it is to be understood that the invention is not limited to those working examples. The following analytical methods were used in the examples.

(1) Determination of Polymer Composition

Polymer was dissolved in deuterated chloroform or deuterated trifluoroacetic acid and determined for composition by means of 400 MHz $^1$H-NMR (JNM-GX400, a product of Japan Electron Optics Laboratory Co., Ltd.).

(2) Determination of Inherent Viscosity

Determination at 30° C. in a mixed phenol/tetrachloroethane (60/40 weight ratio) solvent, using a Ubbelohde's viscometer.

(3) DSC Determination

Determined using Dupont 990 Thermal Analyzer.

(4) Observation with Optical Microscope

Observed using a polarizing microscope BH2 (a product of Olympus Optical Co., Ltd.)

EXAMPLE 1

Using 60 mmol of terephtalic acid, 30 mmol of methylhydroquinone diacetate, 30 mmol of catechol diacetate and 120 mg of sodium acetate, polymerization was performed in a nitrogen atmosphere while the temperature was raised stepwise at 100° C. for 30 minutes, 130° C. for 30 minutes, 150° C. for 1 hour, 200° C. for 1 hour and 250° C. for 1 hour. Then, under a nitrogen gas stream the polymerization was continued at 250° C. for 3 hours and further conducted for 1 hour at the same temperature under reduced pressure. The resulting polymer was dissolved in tetrachloroethane, followed by filtration and subsequent reprecipitation with methanol to afford 10.5 g of purified polymer having the properties shown in Table 1.

There was prepared a 15 wt % tetrachloroethane solution containing this polyester and an optically active polyester of the following formula at a weight ratio of 95:5. Then, this solution was applied by a spin coating method onto a 12 cm by 12 cm glass plate (a product of EHC Co.) having on one side thereof an alignment film of polyimide which had been subjected to a rubbing treatment, and thereafter dried:

n = 0.13

Next, this sample was heat-treated in an air constant-temperature bath at 190° C. for 5 minutes, then taken out from the bath and allowed to cool for immobilization. The film thus obtained on the glass was a completely transparent and smooth film having a thickness of 1.1 μm. The state of orientation of this film was observed under a crossed nicol of a polarizing microscope; as a result, no defects were observed throughout the whole area. Next, this film was subjected to polarization analysis and thereby determined for retardation (Δn d where Δn represents birefringence and d represents the film thickness) and twist angle, which were 0.26 μm (630 nm) and 40°, respectively. It turned out that a twisted nematic structure was immobilized.

EXAMPLE 2

Using the composition described in Example 1, it was cast onto a glass plate having a rubbing-treated polyimide layer with a size of 5 cm × 10 cm and a thickness of 0.1 cm, by means of a screen printer, and then dried. Thereafter, heat treatment and immobilization were performed under the same conditions as in Example 1 to obtain a film for color compensation 3.4 μm in thickness with a twisted nematic structure immobilized.

Figure 1:
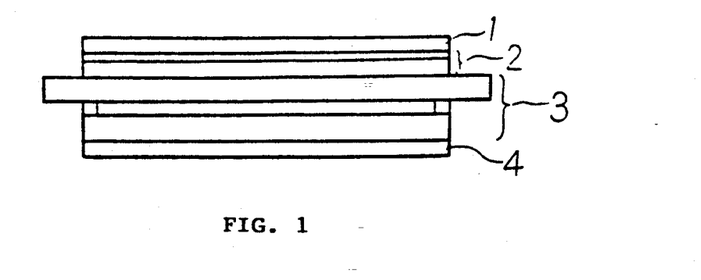
FIG. 1 is a sectional view of the liquid crystal cell used in the working examples of the present invention, provided the adhesive layer used for sticking layers is omitted.
Figure 2:
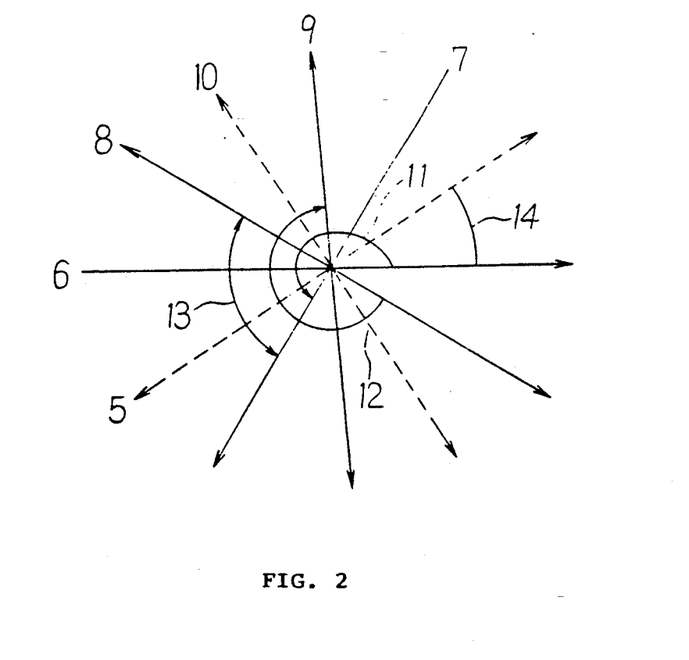
FIG. 2 shows a correlation of the axes of the constituent materials of the liquid crystal cell used in the working examples of the present invention.

A glass plate having this color compensation film on the upper surface thereof was laminated to the upper surface of an STN liquid crystal cell of 1/100 duty drive using an adhesive and in accordance with the arrangement shown in FIG. 1, and further a polarizing plate was stuck thereon to obtain a cell. In this case, the upper/lower polarizing plate direction, upper/lower electrode base rubbing direction, and the molecular orientation direction of the twisted nematic film (the color compensation film) are as shown in FIG. 1. More particularly, the twist angle of the liquid crystal molecule in the liquid crystal cell is 240°, the angle between the axes of polarization of the upper and lower polarizing plates is 90°, the angle between the rubbing direction of the upper electrode base and the molecular orientation direction at the bottom of the twisted nematic film is 90°, the angle between the axis of polarization of the lower polarizing plate and the rubbing direction of the lower electrode plate is about 40°, and the twist angle of the molecule in the twisted nematic film is 240° in the direction opposite to that of the liquid crystal molecule in the liquid crystal cell. The display color of this liquid crystal cell was black in the absence of voltage and it was white when voltage was applied. Thus, a complete black-and-white display could be realized.

EXAMPLES 3-10

60 mmol of terephthalic acid dichloride, 25 mmol of methylhydroquinone, 25 mmol of catechol, 10 mmol of 1,6-hexanediol and 35 ml of pyridine were dissolved in 300 ml of O-dichlorobenzene. The resulting solution was polymerized in a nitrogen gas stream at 70° C. for 3 hours. Then, the reaction solution was filtered, poured into methanol to precipitate the polymer, followed by filtration and drying under reduced pressure, to afford a polyester having the properties shown in Table 1. Yield 10.3 g.

Using the acid chloride process shown here and the melt polycondensation process shown in Example 1, there were prepared such various polyesters containing ortho-substituted aromatic unit as shown in Table 1. Using compositions comprising these polyesters and various optically active compounds, there were prepared color compensation films with a twisted nematic structure immobilized each on a glass plate or a plastic film under the conditions shown in Table 2. Then, the films were checked for color compensating effect in the same manner as in Example 2. As a result, a black-and-white display was obtained in all of the film. Thus, the films for color compensation according to the present invention proved to exhibit the color compensating effect.

EXAMPLE 11

34 mmol of terephthalic acid dichloride, 24 mmol of methylhydroquinone, 24 mmol of catechol, 1,4 mmol of (S)-2-methyl-1,4-butanediol and 35 ml of pyridine were dissolved in 300 ml of O-dichlorobenzene and the resulting solution was polymerized in a nitrogen gas stream at 70° C. for 2 hours. The reaction solution was filtered, then poured into methanol to precipitate the polymer, followed by filtration and subsequent drying under reduced pressure to prepare a polyester having the properties shown in Table 1. Yield 7.5 g.

This polyester was dissolved at a concentration of 15 wt % in a mixed phenol/tetrachloroethane (60/40 weight ratio) solvent. Using this solution, a film for color compensation with a twisted nematic structure immobilized was formed on a glass plate under the conditions set forth in Table 2 and it was then checked for a color compensating effect in the same manner as in Example 2. As a result, there was obtained a complete black-and-white display and thus the film for color compensation according to the present invention proved to exhibit a color compensating effects.

EXAMPLE 12

25 mmol of 4,4′-biphenyldicarboxylic acid dichloride, 18 mmol of methylhydroquinone, 18 mmol of catechol, 0.68 mmol of (S)-3-methyl-1,6-hexanediol and 35 ml of pyridine were dissolved in 300 ml of O-dichlorobenzene and the resulting solution was polymerized in a nitrogen gas stream at 70° C. for 2 hours. The reaction solution was filtered, then poured into methanol to precipitate the polymer, followed by filtration and subsequent drying under reduced pressure to prepare a polyester having the properties shown in Table 1. Yield 8.3 g.

This polyester was dissolved at a concentration of 17 wt % in a mixed phenol/tetrachloroethane (60/40 weight ratio) solvent. Using this solution, a film for color compensation with a twisted nematic structure immobilized was formed on a glass plate under the conditions set forth in Table 2 and it was then checked for color compensating effect in the same manner as in Example 2. As a result, there was obtained a complete black-and-white display and thus the film for color compensation according to the present invention proved to exhibit a color compensating effect.

EXAMPLE 13

50 mmol of 4,4′-biphenyldicarboxylic acid dichloride, 25 mmol of t-butylhydroquinone, 25 mmol of 1,4-butanediol and 35 ml of pyridine were dissolved in 300 ml of O-dichlorobenzene and the resulting solution was polymerized in a nitrogen gas stream at 70° C. for 3 hours. The reaction solution was filtered, then poured into methanol to precipitate the polymer, followed by filtration and subsequent drying under reduced pressure to prepare a polyester having the properties shown in Table 1. Yield 8.3 g.

This polyester and the optically active polyester used in Example 1 were dissolved at a concentration of 17 wt % in a mixed phenol/tetrachloroethane (60/40 weight ratio) solvent. Using the resulting solution, a film for color compensation with a twisted nematic structure immobilized was formed on a glass plate under the conditions set forth in Table 2 and it was then checked for a color compensating effect in the same manner as in Example 2. As a result, there was obtained a complete black-and-white display and thus the film for color compensation according to the present invention proved to exhibit a color compensating effect.

EXAMPLE 14

8 mmol of 2,2′-bistrifluoromethyl-4,4′-biphenyldicarboxylic acid dichloride, 35 mmol of trifluoromethyl-terephthalic acid dichloride, 45 mmol of chlorohydroquinone and 35 ml of pyridine were dissolved in 300 ml of O-dichlorobenzene and the resulting solution was polymerized in a nitrogen gas stream at 80° C. for 3 hours. The reaction solution was filtered, then poured into methanol to precipitate the polymer, followed by filtration and subsequent drying under reduced pressure to prepare a polyester having the properties shown in Table 1. Yield 12.5 g.

This polyester and the optically active polyester used in Example 1 were dissolved at a concentration of 12 wt % in tetrachloroethane. Using this solution, a film for color compensation with a twisted nematic structure immobilized was formed on a glass plate under the conditions set forth in Table 2 and it was checked for a color compensating effect In the same manner as in Example 2. As a result, there was obtained a complete black-and-white display and thus the film for color compensation according to the present invention proved to exhibit a color compensating effect.

Comparative Example 1

60 mmol of terephathalic acid dichloride, 40 mmol of methylhydroquinone, 20 mmol of 6-hexanediol and 35 ml of pyridine were dissolved in 300 ml of O-dichlorobenzene and the resulting solution was polymerized in a nitrogen gas stream at 70° C. for 3 hours. The reaction solution was filtered, then poured into methanol to precipitate the polymer, followed by filtration and subsequent drying under reduced pressure to afford a polyester having the properties shown in Table 1. Using a composition containing this polyester and the optically active polyester used in Example 1, there was prepared a 20 wt % solution in tetrachloroethane and the immobilization of orientation was tried in the same way as in Example 1. However, the resulting film was a whitely turbid film not having transparency. As a result of observation using a polarizing microscope, the film proved to have a disordered orientation in the greater part although there partially remained a twisted nematic orientation. Thus, it could not be used a film for color compensation.

Comparative Example 2

60 mmol of terephthalic acid dichloride, 30 mmol of hydroquinone, 30 mmol of 2-methyl-1,4-butanediol and 35 ml of pyridine were dissolved in 300 ml of O-dichlorobenzene and the resulting solution was polymerized in a nitrogen gas stream at 70° C. for 2 hours. The reaction solution was filtered, then poured into methanol to precipitate the polymer, followed by filtration and subsequent drying under reduced pressure to afford a polyester having the properties shown in Table 1. Using a composition containing this polyester and the optically active polyester used in Example 4 at a ratio of 82:18, there was prepared a 20 wt % solution in dimethylacetamide. Then, using this solution, the formation of a film for color compensation and the evaluation of a color compensating effect of the film as stuck on a liquid crystal cell were performed in the same manner as in Example 2 except that the heat treatment was conducted at 130° C. for 60 minutes. The film obtained was translucent, and as a result of observation using a polarizing microscope it turned out that a twisted nematic orientation of polydomain was immobilized. The color compensating effect of this film was very incomplete. Although there partially was a black-and-white area, the film was not suitable for practical use because of conspicuous unevenness in color.

Effects of the Invention

The compensator for liquid crystal display of the present invent ion not only can change a colored display which is a drawback of the conventional STN display into a complete black-and-white display but also can make color compensation by the use of a single film, so is extremely effective in attaining the reduction in weight of a display unit and the coloring thereof. Further, the production is easy and the yield is high, so the manufactureing cost is low, and thus the industrial value of the compensator of the invention is extremely high.

TABLE 1

| | Polymer Composition (mol %) | Inherent Viscosity | Glass Transition Point (°C.) | Phase Series |
|---|---|---|---|---|
| Ex. 1 | TPA:MHQ:CT:MBD = 48:26:26 | 0.10 | 105 | I → N → g |
| 3 | TPA:MHQ:CT:1.6-HD = 50:22:21:9 | 0.18 | 98 | I → N → g |
| 4 | TPA:CHQ:CT = 49:25:26 | 0.14 | 70 | I → N → g |
| 5 | TPA:NDA:MHQ:CT = 25:24:34:17 | 0.23 | 69 | I → N → g |
| 6 | TPA:HQ:MCT = 50:30:20 | 0.31 | 68 | I → N → g |
| 7 | BPDA:HQ:CCT = 49:34:17 | 0.15 | 82 | I → N → g |
| 8 | TPA:t-BHQ:CT = 49:26:25 | 0.09 | 102 | I → N → g |
| 9 | TPA:PA:MHQ:HQ = 24:24:25:27 | 0.18 | 70 | I → N → g |
| 10 | TPA:SA:MHQ:HQ = 38:24:25:13 | 0.11 | 110 | I → N → g |
| 11 | TPA:MHQ:CT:MBD* = 49:25:24:1.7 | 0.13 | 79 | I → N* → g |
| 12 | BPDA:MHQ:CT:MHD* = 50:23:25:1.5 | 0.09 | 94 | I → N* → g |
| 13 | BPDA:t-BHQ:1,4-BD = 49:26:25 | 0.22 | 63 | I → N → g |
| 14 | FBPDA:FTPA:CHQ = 20:31:49 | 0.30 | 95 | I → N → g |
| Comp. Ex. 1 | TPA:MHQ:1.6-HD = 48:35:17 | 0.20 | 89*1) | I → N → K |
| 2 | TPA:HQ:MBD = 50:26:24 | 0.05 | 45*1) | I → N → K |

TPA: terephthalic acid unit, NDCA: 2,6-naphthalenedicarboxylic acid unit, BPDA: 4,4-biphenyldicarboxylic acid unit, PA: phthalic acid unit, SA: salicylic acid unit, MHQ: methylhydroquinone unit, CHQ: chlorohydroquinone unit, HQ: hydroquinone unit, t-BHQ: t-butylhydroquinone unit, CT: catechol unit, MCT: 3-methylcatechol unit, CCT: 3-chlorocatechol unit, 1,6-HD: 1,6-hexandiol unit, MBD: 2-methyl-1,4-butanediol unit, MBD*: (S)-2-methyl-1,4-butanediol, MHD*(S)-3-methyl-1,6-hexanediol unit, 1,4-BD: 1,4-butanediol unit, FBPDA: 2,2'-bistrifluoromethyl-4,4'-biphenyldicarboxylic acid unit, FTPA: trifluomethylterephthalic acid.
I: isotropic phase, N: nematic phase, N*: twisted nematic phase, g: glass phase, K: crystal phase
*1) indicates a crystallization temperature, not a glass transition point.

TABLE 2

| Ex | Optically Active Compounds | Composition Ratio *1 | Base | Heat Treatment Conditions (°C × min) | Film Thickness (μm) | Twist Angle (deg) | Color Compensating Effect |
|---|---|---|---|---|---|---|---|
| 3 | ⟨benzoate with -C₄₉(O-CH₂-CHCH₃-CH₂-O)₂₀(O(CH₂)₈O)₅₁-⟩ | 91:19 | Polyether sulfone film | 150 × 30 | 4.1 | 243 | ◉ |
| 4 | ⟨biphenyl benzoate with -C₅₀(O-CH₂-CHCH₃-CH₂-CH₂-O)₂₀-⟩ | 82:18 | Glass plate | 250 × 15 | 2.8 | 239 | ◉ |
| 5 | " | 87:13 | Glass plate | 220 × 15 | 3.7 | 240 | ◉ |
| 6 | ⟨benzoate with -C₅₀(O-CH₂-CHCH₃-CH₂-O)₅₀-⟩ | 97:3 | Glass plate | 200 × 30 | 3.2 | 245 | ◉ |
| 7 | ⟨benzoate with Cl, -C₇₅(O-CH₂-CHCH₃-CH₂-O)₄₉-⟩ | 98:2 | Polyimide film | 200 × 20 | 3.4 | 242 | ◉ |
| 8 | ⟨biphenyl with CH₃ branch, C₈H₁₇O-, -COOCH₂-CHCH₂-CH₃⟩ | 96:4 | Polyether sulfone film | 150 × 10 | 3.7 | 240 | ◉ |
| 9 | ⟨C₁₀H₂₁O-phenyl-CH=N-phenyl-CH=CHCOOCH₂-CHCH₂-CH₃⟩ | 94:6 | Glass plate | 180 × 5 | 3.2 | 235 | ◉ |
| 10 | ⟨biphenyl -O)₂₄(O-C-CH₂-CHCH₃-CH₂-C)₇₆⟩ | 97:3 | Glass plate | 200 × 1 | 4.0 | 238 | ◉ |
| 11 | none | 100:0 | Glass plate | 200 × 5 | 3.3 | 240 | ◉ |
| 12 | none | 100:0 | Glass plate | 200 × 5 | 4.6 | 238 | ◉ |
| 13 | ⟨biphenyl benzoate with -C₄₉-O-CH₂-CHCH₃-CH₂-O)₇₀(O(CH₂)₈O)₂₁-⟩ | 96:4 | Glass plate | 120 × 3 | 3.6 | 239 | ◉ |
| 14 | " | 97:4 | Glass plate | 180 × 5 | 3.6 | 240 | ◉ |

*1 Weight ratio of a polyester containing an o-substituted aromatic unit and an optically active compound.

What is claimed is:

1. A compensator for liquid crystal display, comprising:
   a light transmitting base;
   an alignment layer formed on said base; and
   a film formed on said alignment layer by a liquid crystalline polymer which exhibits a twisted nematic orientation in the state of liquid crystal and which assumes the state of glass at a temperature below the liquid crystal transition point thereof, said liquid crystalline polymer being
   (1)
   (a) an optically active main chain type liquid crystalline polymer selected from the group consisting of polyesters, polyamides, polycarbonates and polyesterimides, or
   (b) an optically active side chain type liquid crystalline polymer selected from the group consisting of polyacrylates, polymethacrylates and polysiloxanes, or
   (2)
   (a) a main chain type liquid crystalline polymer selected from the group consisting of polyesters, polyamides, polycarbonates and polyesterimides, in combination with an optically active compound, or
   (b) a side chain type liquid crystalline polymer selected from the group consisting of polyacrylates, polymethacrylates and polysiloxanes, in combination with an optically active compound.

2. A compensator for liquid crystal display as set forth in claim 1, wherein said liquid crystalline polymer is an optically active polyester containing an ortho-substituted aromatic unit.

3. A compensator for liquid crystal display, comprising:
   a light transmitting base;
   an alignment layer formed on said base; and a liquid crystalline polymer film formed on said alignment layer, said liquid crystalline polymer film containing as a main component a polyester which contains an ortho-substituted aromatic unit as a constituent.

4. A compensator for liquid crystal display as set forth in claim 3, wherein said liquid crystalline polymer film is formed by a liquid crystalline polymer composition comprising a polyester which contains an ortho-substituted aromatic unit as a constituent and an optically active compound.

5. A compensator for liquid crystal display as set forth in claim 4, wherein said optically active compound is a polymer having an optically active group.

6. A compensator for STN liquid crystal display, having a film obtained by heat-treating an optically active polyester containing an ortho-substituted aromatic unit, or a composition containing a liquid crystalline polyester and an optically active compound which liquid crystalline polyester contains an ortho-substituted aromatic unit as a constituent, on an alignment layer at a temperature above the glass transition point of said polyester, followed by cooling to a temperature below said glass transition point to immobilize a twisted nematic structure.

7. A compensator as set forth in claim 6, wherein said optically active compound is a polymer having an optically active group.

8. A compensator for liquid crystal display as set forth in claim 1, wherein said liquid crystal display is a super twisted nematic type liquid crystal display.

9. A compensator for liquid crystal display comprising:
   a light transmitting base;
   an alignment layer formed on said base; and
   a film formed on said alignment layer by a liquid crystalline polymer which exhibits a twisted nematic orientation in the state of liquid crystal and which assumes the state of glass at a temperature below the liquid crystal transition point thereof, thereby providing a black-and-white display, said liquid crystalline polymer being
   (1)
   (a) an optically active main chain type liquid crystalline polymer selected from the group consisting of polyesters, polyamides, polycarbonates and polyesterimides, or
   (b) an optically active side chain type liquid crystalline polymer selected from the group consisting of polyacrylates, polymethacrylates and polysiloxanes, or
   (2)
   (a) a main chain type liquid crystalline polymer selected from the group consisting of polyesters polyamides, polycarbonates and polyesterimides, in combination with an optically active compound or
   (b) a side chain type liquid crystalline poller selected from the group consisting of polyacrylates, polymethacrylates and polysiloxanes, in combination with an optically active compound.

10. A compensator for liquid crystal display as set forth in claim 9, wherein said liquid crystalline polymer is an optically active polyester or a composition of a polyester and an optically active compound.

11. A compensator for liquid crystal display as set forth in claim 9, wherein said liquid crystalline polymer is an optically active polyester containing an ortho-substituted aromatic unit, or a composition of a liquid crystalline polyester containing an ortho-substituted aromatic unit and an optically active compound.

* * * * *

UNITED STATES PATENT AND TRADEMARK OFFICE
CERTIFICATE OF CORRECTION

PATENT NO. : 5,326,496
DATED : July 5, 1994
INVENTOR(S) : Shigeki Iida, et al.

It is certified that error appears in the above-indentified patent and that said Letters Patent is hereby corrected as shown below:

Column 1, line 12: "nd" should read --and--

Column 5, line 56: "describe" should read --described--

Column 5, line 59: after "diol" delete --)--

Column 7, line 27: after "m" insert --is--

Column 12, line 34: "Of" should read --of--

Column 18, line 23: "large" should read --larger--

Column 18, line 37: "ape" should read --are--

Column 18, line 39: "assuming" should read --Assuming--

Column 20, line 43: "In" should read --in--

Column 24, line 7: "In" should read --in--

UNITED STATES PATENT AND TRADEMARK OFFICE
CERTIFICATE OF CORRECTION

PATENT NO. : 5,326,496
DATED : July 5, 1994
INVENTOR(S) : Shigeki Iida, et al.

It is certified that error appears in the above-indentified patent and that said Letters Patent is hereby corrected as shown below:

Column 24, line 64: "invent ion" should read --invention--

Column 25, line 16: "1,4" should read --1.4--

Column 27, line 24: "Treatmet" should read -- Treatment --.

Column 30, line 41, Claim 9: "poller" should read --polymer--

Signed and Sealed this

Seventh Day of March, 1995

Attest:

BRUCE LEHMAN

*Attesting Officer*   *Commissioner of Patents and Trademarks*